United States Patent
Kuan et al.

(10) Patent No.: US 8,255,608 B2
(45) Date of Patent: Aug. 28, 2012

(54) MOTHERBOARD USED IN SERVER COMPUTER

(75) Inventors: Te-Chung Kuan, Taipei Hsien (TW); Pei-Lin Huang, Taipei Hsien (TW); Chan-Kuei Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 264 days.

(21) Appl. No.: 12/843,047

(22) Filed: Jul. 26, 2010

(65) Prior Publication Data

US 2011/0296075 A1 Dec. 1, 2011

(30) Foreign Application Priority Data

May 31, 2010 (TW) .................. 99117372 A

(51) Int. Cl.
*G06F 13/00* (2006.01)
(52) U.S. Cl. .................. 710/316; 710/301
(58) Field of Classification Search .................. 710/100, 710/104, 301, 316
See application file for complete search history.

(56) References Cited

U.S. PATENT DOCUMENTS

2007/0112988 A1* 5/2007 Yang et al. .................. 710/301
2011/0197012 A1* 8/2011 Liao et al. .................. 710/316

* cited by examiner

*Primary Examiner* — Glenn A Auve
(74) *Attorney, Agent, or Firm* — Altis Law Group, Inc.

(57) ABSTRACT

An exemplary motherboard includes a substrate, a first CPU socket provided on the substrate for receiving a first CPU, a second CPU socket provided on the substrate for receiving a second CPU, a switching circuit connected to the first CPU and the second CPU, at least one quick path interconnect (QPI) bus connecting the first CPU to the second CPU, a number of first peripheral component interconnect express (PCI-e) interfaces connected to the first CPU via a number of first wires, a number of second PCI-e interfaces connected to the second CPU via a number of second wires, and a activating chip connected to the first CPU and the second CPU via the switching circuit and configured for starting a peripheral device connected to the first PCI-e interfaces or the second PCI-e interfaces.

9 Claims, 2 Drawing Sheets

MOTHERBOARD USED IN SERVER COMPUTER

BACKGROUND

1. Technical Field

The disclosure relates to computer devices and, particularly, to a motherboard used in a sever computer.

2. Description of Related Art

A typical rack-type server computer or a tower-type server computer often includes a first central processing unit (CPU), a second CPU and an activating chip. The first CPU is directly connected to the activating chip. The second CPU is connected to the activating chip via the first CPU. The activating chip can activate the first CPU directly, or activate the first and second CPUs to work at the same time because of the connection between the first CPU and the second CPU. However, when the server is required to activate only the second CPU and not activate the first CPU, a very complicated change, such as changing the layout of the motherboard, is needed. This increases the cost of mass production of the server computer.

Therefore, it is desirable to provide a motherboard which can overcome the problems described above.

DETAILED DESCRIPTION

Figure 1:
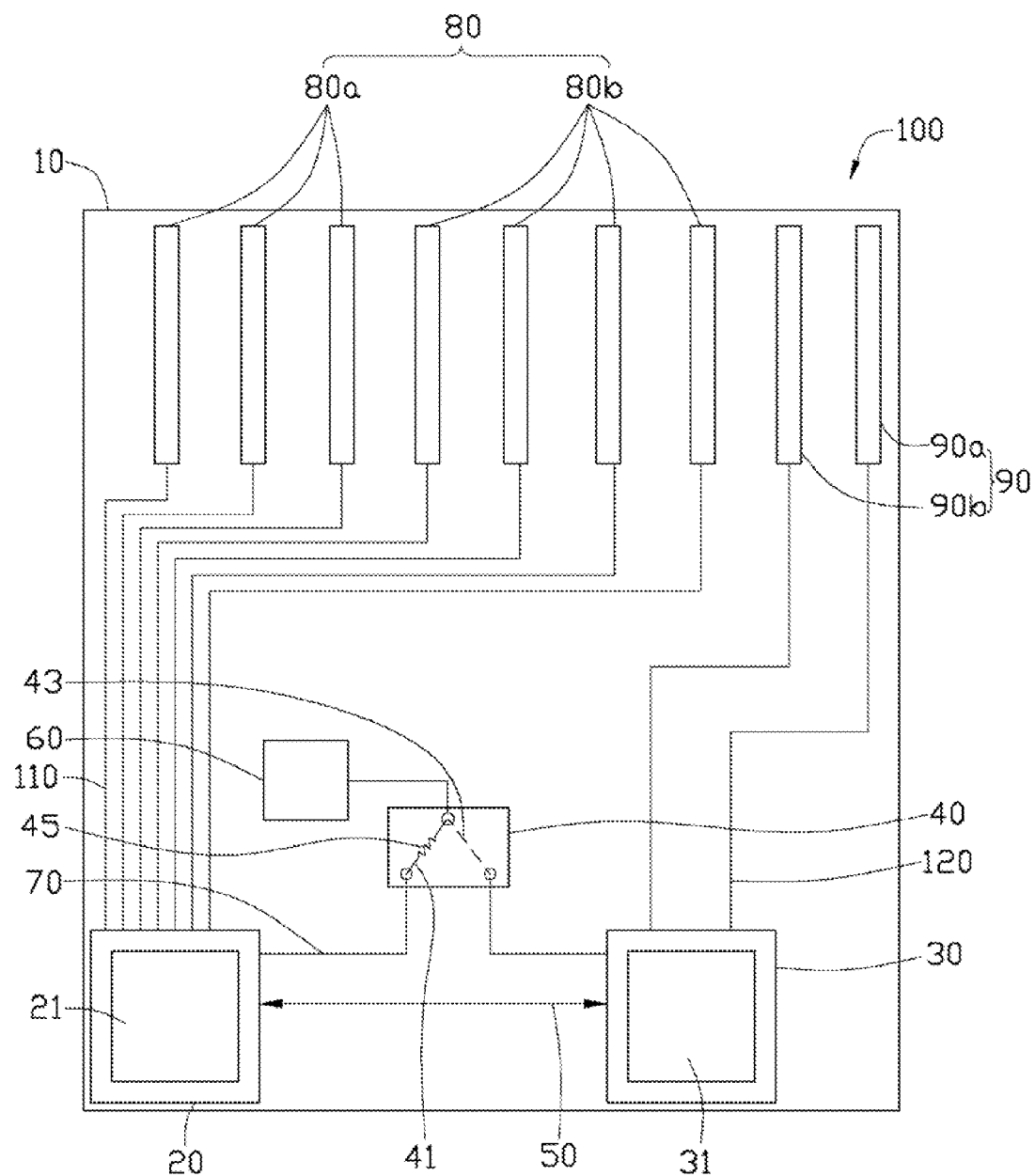
FIG. 1 is a schematic, plan view of a motherboard according to an exemplary embodiment, showing the motherboard in a first state.
Figure 2:
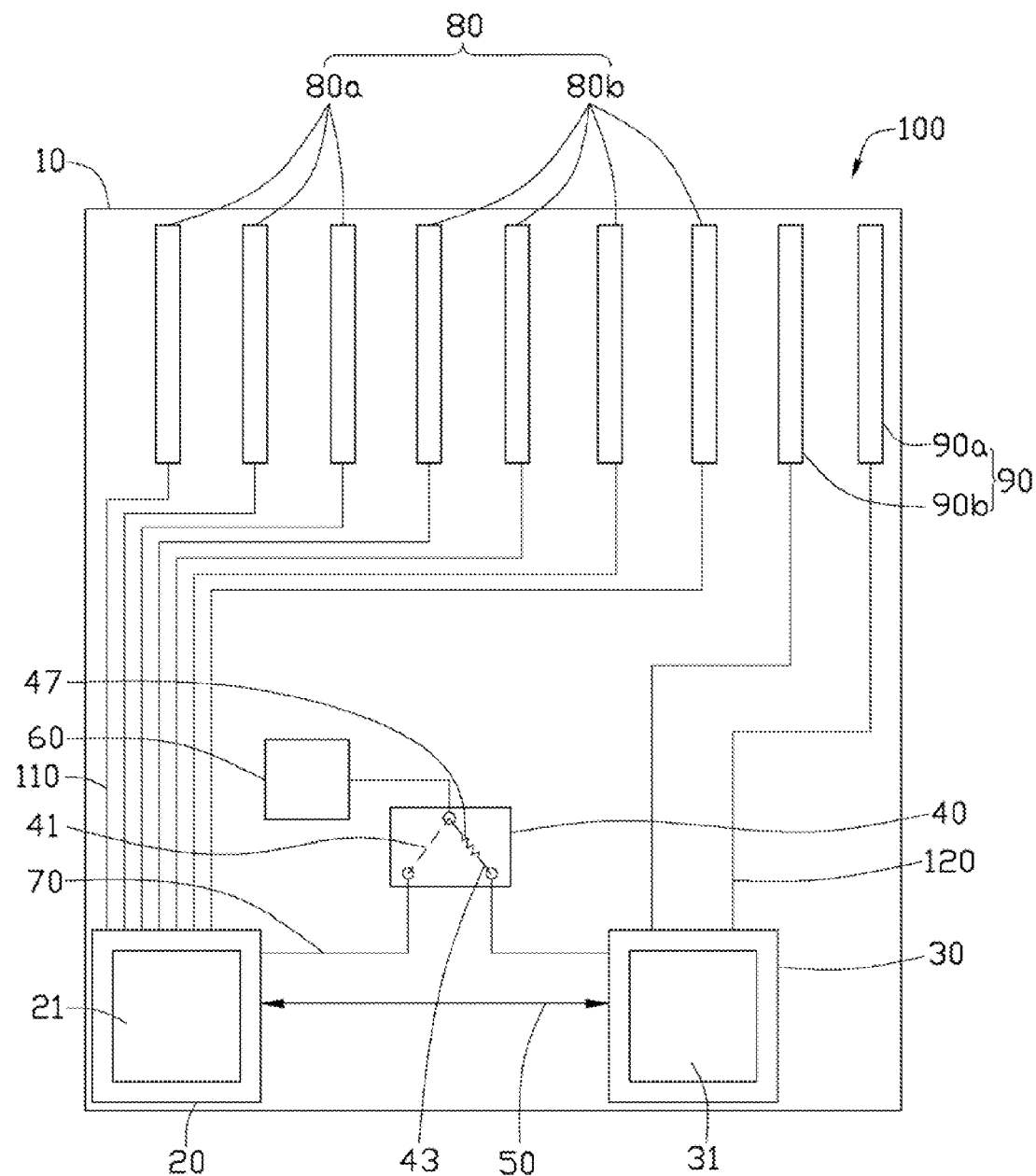
FIG. 2 is similar to FIG. 1, but showing the motherboard in a second state.

Referring to FIGS. 1 and 2, a motherboard 100 used in a server computer, according to an exemplary embodiment, includes a substrate 10, a first CPU socket 20 receiving a first CPU 21, a second CPU socket 30 receiving a second CPU 31, a switching circuit 40, a quick path interconnect (QPI) bus 50, an activating chip 60, a number of direct media interface (DMI) buses 70, a number of first peripheral component interconnect express (PCI-e) interfaces 80, a number of second PCI-e interfaces 90, a number of first wires 110, and a number of second wires 120.

The substrate 10 is typically a printed circuit board (PCB). The first CPU socket 20, the second CPU socket 30, the first PCI-e interfaces 80, the second PCI-e interfaces 90, the switching circuit 40, the QPI buses 50, the first wires 110, the second wires 120, and the activating chip 60 are all disposed on the substrate 10.

The first CPU socket 20 and the second CPU socket 30 are disposed on a same surface of the substrate 10 and are substantially parallel to each other. The activating chip 60 is disposed on one side of the first CPU socket 20. The first PCI-e interfaces 80 and the second PCI-e interfaces 90 are arranged parallel to each other. The first and second PCI-e interfaces 80, 90 are arranged at one side of the substrate 10, and the first and second CPU sockets 20, 30 are arranged at an opposite side of the substrate 10. The first CPU socket 20 is opposite to the first PCI-e interfaces 80, and the second CPU socket 30 is approximately opposite to the second PCI-e interfaces 90.

The QPI bus 50 electrically connects the first CPU socket 20 to the second CPU socket 30, and is configured for transmitting information between the first CPU 21 and the second CPU 31. The first CPU 21 is connected to the first PCI-e interfaces 80 via the first wires 110 and the first CPU socket 20. The second CPU 31 is connected to the second PCI-e interfaces 90 via the second CPU socket 30 and the second wires 120. In the present embodiment, the first PCI-e interfaces 80 include three 8-channel PCI-e interfaces 80a and four 4-channel PCI-e interfaces 80b. The second PCI-e interfaces 90 include a 24-channel PCI-e interface 90a and a 16-channel PCI-e interface 90b.

The activating chip 60 is connected to both of the first CPU 21 and the second CPU 31 via the switching circuit 40, and is configured for starting (i.e., activating) a peripheral device such as a Platform Controller Hub (PCH, not shown) connected to one of the first PCI-e interfaces 80 or one of the second PCI-e interfaces 90.

The switching circuit 40 is connected to the first CPU 21, the second CPU 31, and the activating chip 60 via three DMI buses 70. In the present embodiment, DMI v.2.0 buses are used. The switching circuit 40 includes a first transmission channel 41 and a second transmission channel 43. The second transmission channel 43 has a reversed state relative to the first transmission channel 41. That is, when the first transmission channel 41 is in an on-state, the second transmission channel 43 is in an off-state; and vice versa. The first transmission channel 41 is connected between the activating chip 60 and the first CPU 21. The second transmission channel 43 is connected between the activating chip 60 and the second CPU 31. It is understood that, in other embodiments, the switching circuit 40 may use a single-pole double-throw switch.

When the motherboard 100 serves as a rack-type server, the first transmission channel 41 connects the activating chip 60 to the first CPU 21 via a resister 45 disposed in the switch circuit 40. Thereby, the activating chip 60 starts the peripheral device connected to, e.g., one of the first PCI-e interfaces 80. When the motherboard 100 serves as a tower-type server, the second transmission channel 43 connects the activating chip 60 to the second CPU 31 via another resister 47 disposed in the switch circuit 40. Thereby, the activating chip 60 starts the peripheral device connected to the second PCI-e interfaces 90. Therefore the motherboard 100 can utilize the different first and second CPUs 21, 31 correspondingly and appropriately, according to the state of the switch circuit 40.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements and equivalents thereof.

What is claimed is:

1. A motherboard comprising:
a substrate;
a first central processing unit (CPU) socket provided on the substrate and receiving a first CPU;
a second CPU socket provided on the substrate and receiving a second CPU;
a switching circuit electrically connected to the first CPU and the second CPU;
at least one quick path interconnect (QPI) bus electrically connecting the first CPU to the second CPU;
a plurality of first peripheral component interconnect express (PCI-e) interfaces electrically connected to the first CPU via a plurality of first wires;
a plurality of second PCI-e interfaces electrically connected to the second CPU via a plurality of second wires; and an activating chip electrically connected to the first CPU and the second CPU via the switching circuit and configured for starting at least one peripheral device connected to one of the first PCI-e interfaces or one of the second PCI-e interfaces.

2. The motherboard of claim 1, wherein the substrate is a printed circuit board (PCB).

3. The motherboard of claim 1, wherein the first CPU socket and the second CPU socket are disposed on a same surface of the substrate and are parallel to each other.

4. The motherboard of claim 3, wherein the activating chip is disposed on one side of the first CPU socket and the second CPU socket, the first PCI-e interfaces and the second PCI-e interfaces are arranged parallel to each other on said same surface of the substrate, the first PCI-e interfaces are positioned approximately opposite to the first CPU socket, and the second PCI-e interfaces are positioned approximately opposite to the second CPU socket.

5. The motherboard of claim 1, wherein the first PCI-e interfaces comprise three 8-channel PCI-e interfaces and four 4-channel PCI-e interfaces, and the second PCI-e interfaces comprise a 24-channel PCI-e interface and a 16-channel PCI-e interface.

6. The motherboard of claim 1, wherein the switching circuit comprises a first transmission channel and a second transmission channel which has a reversed state of the first transmission channel, the first transmission channel is connected between the activating chip and the first CPU, and the second transmission channel is connected between the activating chip and the second CPU.

7. The motherboard of claim 1, wherein the switching circuit comprises a single-pole double-throw switch.

8. The motherboard of claim 1, wherein the switching circuit is electrically connected to the first CPU and the second CPU via two direct media interface (DMI) buses.

9. A motherboard comprising:
a substrate;
a first central processing unit (CPU) socket provided on the substrate for receiving a first CPU;
a second CPU socket provided on the substrate for receiving a second CPU;
a switching circuit connected to the first CPU socket and the second CPU socket;
at least one quick path interconnect (QPI) bus connecting the first CPU socket to the second CPU socket;
a plurality of first peripheral component interconnect express (PCI-e) interfaces connected to the first CPU socket via a plurality of first wires;
a plurality of second PCI-e interfaces connected to the second CPU socket via a plurality of second wires; and
an activating chip connected to the first CPU socket and the second CPU socket via the switching circuit and configured for starting a peripheral device connected to one of the first PCI-e interfaces or one of the second PCI-e interfaces.

* * * * *